(12) United States Patent
Zhou et al.

(10) Patent No.: US 10,348,540 B2
(45) Date of Patent: Jul. 9, 2019

(54) COMMUNICATION METHOD AND APPARATUS, AND STORAGE MEDIUM

(71) Applicant: Beijing Xiaomi Mobile Software Co., Ltd., Haidian District, Beijing (CN)

(72) Inventors: Juejia Zhou, Beijing (CN); Wei Hong, Beijing (CN); Ming Zhang, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 19 days.

(21) Appl. No.: 15/599,489

(22) Filed: May 19, 2017

(65) Prior Publication Data

US 2017/0338987 A1    Nov. 23, 2017

(30) Foreign Application Priority Data

May 20, 2016  (CN) .......................... 2016 1 0342243

(51) Int. Cl.
| | |
|---|---|
| *H04L 5/00* | (2006.01) |
| *H04L 27/26* | (2006.01) |
| *H04W 72/04* | (2009.01) |
| *H04W 74/08* | (2009.01) |

(52) U.S. Cl.
CPC ........ *H04L 27/2602* (2013.01); *H04L 5/0007* (2013.01); *H04L 5/0037* (2013.01); *H04L 5/0053* (2013.01); *H04W 72/042* (2013.01); *H04W 72/0406* (2013.01);

(Continued)

(58) Field of Classification Search
CPC ...................... H04L 27/2602; H04W 74/0833
See application file for complete search history.

(56) References Cited

U.S. PATENT DOCUMENTS

| | | | |
|---|---|---|---|
| 9,319,957 B1 * | 4/2016 | Singh | H04W 36/30 |
| 2006/0159004 A1 * | 7/2006 | Ji | H04W 16/04 |
| | | | 370/208 |

(Continued)

FOREIGN PATENT DOCUMENTS

| | | |
|---|---|---|
| CN | 101577857 A | 11/2009 |
| CN | 101867550 A | 10/2010 |

(Continued)

OTHER PUBLICATIONS

3GPP et al., "Design considerations for E-PDCCH", 3GPP TSG RAN WG1 meeting #66 bis, published on Oct. 2011 (Year: 2011).*

(Continued)

*Primary Examiner* — Parth Patel
(74) *Attorney, Agent, or Firm* — Jun He Law Offices P.C.; James J. Zhu

(57) ABSTRACT

A communication method and apparatus, and a storage medium are provided. The method is applied to a user equipment and includes: receiving first control signaling transmitted by a first time-frequency area of a fixed subcarrier interval, the first control signaling carrying time-frequency location information of a second time-frequency area of a variable subcarrier interval; and communicating with a base station by using the second time-frequency area, according to the time-frequency location information of the second time-frequency area indicated by the first control signaling.

17 Claims, 9 Drawing Sheets

(52) U.S. Cl.
CPC ...... *H04W 74/0833* (2013.01); *H04W 72/048* (2013.01); *H04W 72/0446* (2013.01)

(56) References Cited

U.S. PATENT DOCUMENTS

| | | | | |
|---|---|---|---|---|
| 2009/0185630 A1* | 7/2009 | Yang | ............... | H04L 25/0212 375/260 |
| 2010/0254344 A1* | 10/2010 | Wei | ............... | H04W 16/10 370/330 |
| 2011/0211551 A1* | 9/2011 | Parkvall | ............... | H04L 5/0053 370/330 |
| 2012/0069786 A1* | 3/2012 | Wiatrowski | ............... | G01S 5/14 370/315 |
| 2012/0184206 A1* | 7/2012 | Kim | ............... | H04L 5/0091 455/9 |
| 2013/0039201 A1* | 2/2013 | Kwon | ............... | H04L 45/22 370/252 |
| 2013/0294309 A1* | 11/2013 | Choi | ............... | H04W 52/0209 370/311 |
| 2014/0003242 A1* | 1/2014 | Nadas | ............... | H04L 47/12 370/235 |
| 2014/0029428 A1* | 1/2014 | Lin | ............... | H04L 5/0048 370/235 |
| 2014/0071954 A1* | 3/2014 | Au | ............... | H04W 72/0446 370/336 |
| 2014/0086216 A1* | 3/2014 | Yang | ............... | H04L 1/1614 370/335 |
| 2014/0106766 A1* | 4/2014 | Burchardt | ............... | H04W 52/241 455/452.1 |
| 2015/0011215 A1* | 1/2015 | Uemura | ............... | H04W 72/042 455/436 |
| 2015/0163730 A1* | 6/2015 | Zhang | ............... | H04W 48/16 370/329 |
| 2015/0181491 A1* | 6/2015 | Van Phan | ............... | H04W 28/08 370/331 |
| 2015/0256308 A1* | 9/2015 | Ma | ............... | H04L 5/0035 370/330 |
| 2015/0271656 A1* | 9/2015 | Sachs | ............... | H04W 8/005 370/329 |
| 2015/0280875 A1* | 10/2015 | Jing | ............... | H04L 5/0023 370/329 |
| 2015/0304932 A1* | 10/2015 | Wei | ............... | H04J 11/0069 370/331 |
| 2015/0350942 A1* | 12/2015 | Wei | ............... | H04W 24/08 370/330 |
| 2016/0013906 A1* | 1/2016 | Guo | ............... | H04L 5/0048 370/329 |
| 2016/0065343 A1* | 3/2016 | Kim | ............... | H04J 11/0053 370/329 |
| 2016/0143017 A1* | 5/2016 | Yang | ............... | H04L 1/1812 370/329 |
| 2016/0198345 A1* | 7/2016 | Fan | ............... | H04W 16/10 370/338 |
| 2016/0248533 A1* | 8/2016 | Li | ............... | H04W 24/10 |
| 2016/0254879 A1 | 9/2016 | Fan et al. | | |
| 2016/0309367 A1* | 10/2016 | Li | ............... | H04L 12/6418 |
| 2017/0041941 A1* | 2/2017 | Chen | ............... | H04W 72/02 |
| 2017/0099164 A1* | 4/2017 | Jiang | ............... | H04L 25/03 |
| 2017/0118055 A1* | 4/2017 | Guey | ............... | H04L 1/0005 |
| 2017/0156140 A1* | 6/2017 | Islam | ............... | H04L 27/2601 |
| 2017/0181149 A1* | 6/2017 | Ang | ............... | H04L 5/003 |
| 2017/0223725 A1* | 8/2017 | Xiong | ............... | H04L 5/0053 |
| 2017/0257238 A1* | 9/2017 | Qian | ............... | H04B 7/0626 |
| 2017/0289899 A1* | 10/2017 | You | ............... | H04W 48/12 |
| 2017/0303140 A1* | 10/2017 | Li | ............... | H04W 4/00 |
| 2017/0324524 A1* | 11/2017 | Zhou | ............... | H04L 5/0007 |
| 2017/0331605 A1* | 11/2017 | Shani | ............... | H04L 5/0048 |
| 2018/0027481 A1* | 1/2018 | Xu | ............... | H04W 72/1226 370/252 |
| 2018/0092079 A1* | 3/2018 | Tang | ............... | H04W 4/00 |
| 2018/0098331 A1* | 4/2018 | Zhao | ............... | H04W 72/04 |
| 2018/0124817 A1* | 5/2018 | Zhang | ............... | H04W 72/1289 |
| 2018/0145819 A1* | 5/2018 | Axmon | ............... | H04W 4/70 |
| 2018/0146418 A1* | 5/2018 | Sharma | ............... | H04W 4/70 |
| 2018/0199341 A1* | 7/2018 | Baldemair | ............... | H04W 72/0453 |
| 2018/0206253 A1* | 7/2018 | Yun | ............... | H04L 5/0062 |

FOREIGN PATENT DOCUMENTS

| | | |
|---|---|---|
| CN | 103095632 A | 5/2013 |
| CN | 105122709 A | 12/2015 |
| EP | 2209275 A2 | 7/2010 |

OTHER PUBLICATIONS

Extended European search report of European Patent Application No. 17171611.1, from the European Patent office, dated Oct. 16, 2017.

Mediatek Inc, "Discussion on resource allocation of NB-PUSCH", published on Feb. 6, 2016, R1-160774. XP051064375,Retrieved from the Internet:URL:http://www.3gpp.org/ftp/tsg_ran/WG1_RL1/TSGR1_84/Docs/ [retrieved on Feb. 6, 2016].

Research in Motion et al, "Design Consideration for E-PDCCH", published on Oct. 4, 2011, XP050538352, [retrieved on Oct. 4, 2011].

ZTE et al, "Frequency multiplexing of different numerologies", published on May 14, 2016, R1-164273, XP051090019. Retrieved from the Internet:URL:http://www.3gpp.org/ftp/tsg_ran/WG1_RL1/TSGR1_85/Docs/ [retrieved on May 14, 2016].

Fujitsu, "NR Sub-carrier spacing", published on May 13, 2016, R1-164330. XP051090161. Retrieved from the Internet:URL:http://www.3gpp.org/ftp/tsg_ran/WG1_RL1/TSGR1_85/Docs/ [retrieved on May 13, 2016].

International Search Report of PCT/CN2016/095564.

\* cited by examiner

COMMUNICATION METHOD AND APPARATUS, AND STORAGE MEDIUM

CROSS REFERENCE TO RELATED APPLICATIONS

The application is based upon and claims priority to Chinese Patent Application No. 201610342243.2, filed on May 20, 2016, which is incorporated herein by reference in its entirety.

TECHNICAL FIELD

The present disclosure relates to the technical field of communications, and more particularly to a communication method and apparatus, and a storage medium.

BACKGROUND

With the continuous progress of technologies, wireless communication technologies gradually evolve to 5G (the 5th Generation Mobile Communication). Since coming into the 5G stage, one important aim is to achieve flexible configuration of services including broadband connection service, Internet of Things service, Internet of Vehicles service, broadcast service and so on. Since different services have different requirements for indexes of wireless communication systems (for example, a broadband connection service needs high broadband transmission rate and an Internet of Things service needs more narrowband connections), it is desirable for the wireless communication systems to allocate time-frequency resources more flexibly. For example, as shown in FIG. 1, time-frequency resource blocks of different size are configured flexibly, instead of configuring time-frequency resource blocks of the same size. Under this configuration mechanism, the subcarrier interval also needs to be configured flexibly according to service demands. That is, a variable subcarrier interval, instead of a fixed subcarrier interval, is configured flexibly according to different services. However, at present, a user equipment can only communicate with a base station normally in the case of a fixed subcarrier interval. Therefore, taking into account flexible service configuration as well as communication demands, how to perform communications in the case of a dynamic and variable subcarrier interval needs to be addressed.

SUMMARY

According to a first aspect of embodiments of the present disclosure, a communication method is provided. The method is applied to a user equipment and includes: receiving first control signaling transmitted by a first time-frequency area of a fixed subcarrier interval, the first control signaling carrying time-frequency location information of a second time-frequency area of a variable subcarrier interval; and communicating with a base station by using the second time-frequency area, according to the time-frequency location information of the second time-frequency area indicated by the first control signaling.

According to a second aspect of the embodiments of the present disclosure, a communication method is provided. The method is applied to a base station and includes: transmitting first control signaling by using a first time-frequency area of a fixed sub carrier interval, the first control signaling carrying time-frequency location information of a second time-frequency area of a variable subcarrier interval; and communicating with a user equipment by using the second time-frequency area, according to the time-frequency location information of the second time-frequency area.

According to a third aspect of the embodiments of the present disclosure, a communication apparatus is provided and includes: a processor; and a memory for storing instructions executable by the processor. The processor is configured to: receive first control signaling transmitted by a first time-frequency area of a fixed subcarrier interval, the first control signaling carrying time-frequency location information of a second time-frequency area of a variable subcarrier interval; and communicate with a base station by using the second time-frequency area, according to the time-frequency location information of the second time-frequency area indicated by the first control signaling.

According to a fourth aspect of the embodiments of the present disclosure, there is provided a non-transitory computer-readable storage medium having stored therein instructions that, when executed by a processor of a mobile terminal, causes the mobile terminal to perform a communication method, and the method includes: receiving first control signaling transmitted by a first time-frequency area of a fixed subcarrier interval, the first control signaling carrying time-frequency location information of a second time-frequency area of a variable subcarrier interval; and communicating with a base station by using the second time-frequency area, according to the time-frequency location information of the second time-frequency area indicated by the first control signaling.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated into the description and constitute a part thereof, illustrate embodiments consistent with the present disclosure and, together with the description, serve to explain the principles of the present disclosure.

DETAILED DESCRIPTION

Here, exemplary embodiments will be described in detail, examples of which are illustrated in the accompanying drawings. The following description refers to the accompanying drawings in which the same numbers in different figures represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

Figure 2:
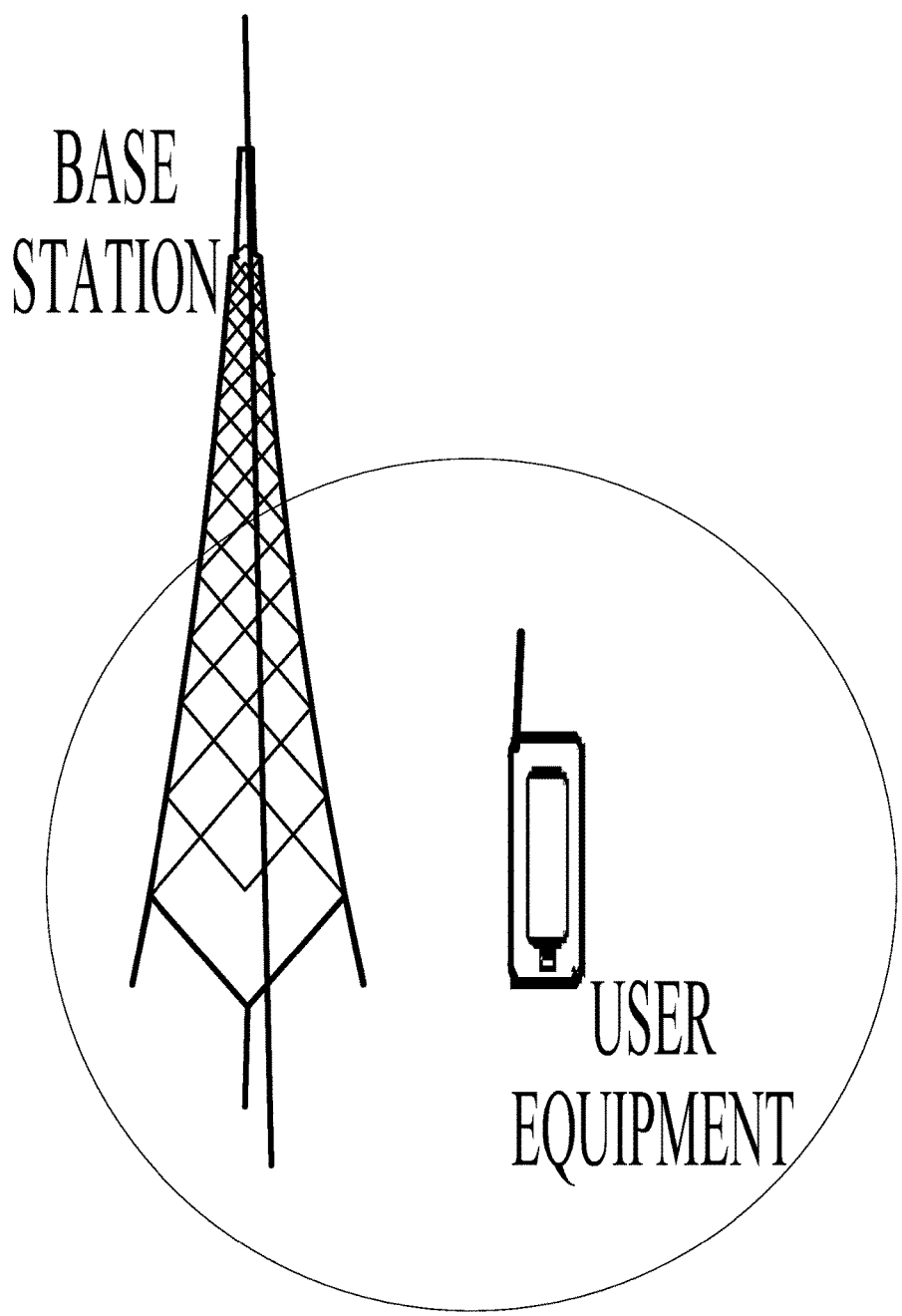
FIG. 2 is a schematic diagram illustrating an implementation scenario according to an exemplary embodiment.

FIG. 2 is a schematic diagram illustrating an implementation scenario according to an exemplary embodiment. Referring to FIG. 2, the implementation scenario includes a user equipment and a base station. The user equipment provided in the embodiments of the present disclosure can be a mobile terminal, a personal communication service telephone, a cordless telephone, a session initiation protocol telephone, a wireless local loop station, a personal digital assistant and so on. The base station may refer to a device which has a wireless resource management function and which can communicate with the user equipment or can be used as a central controller to assist direct communication between user equipments. The base station can be a GSM (Global System for Mobile Communication) or CDMA (Code Division Multiple Access) base station and can also be a WCDMA (Wideband Code Division Multiple Access) base station or an LTE (Long Term Evolution) evolved base station, which is not limited in the present disclosure.

Figure 3A:
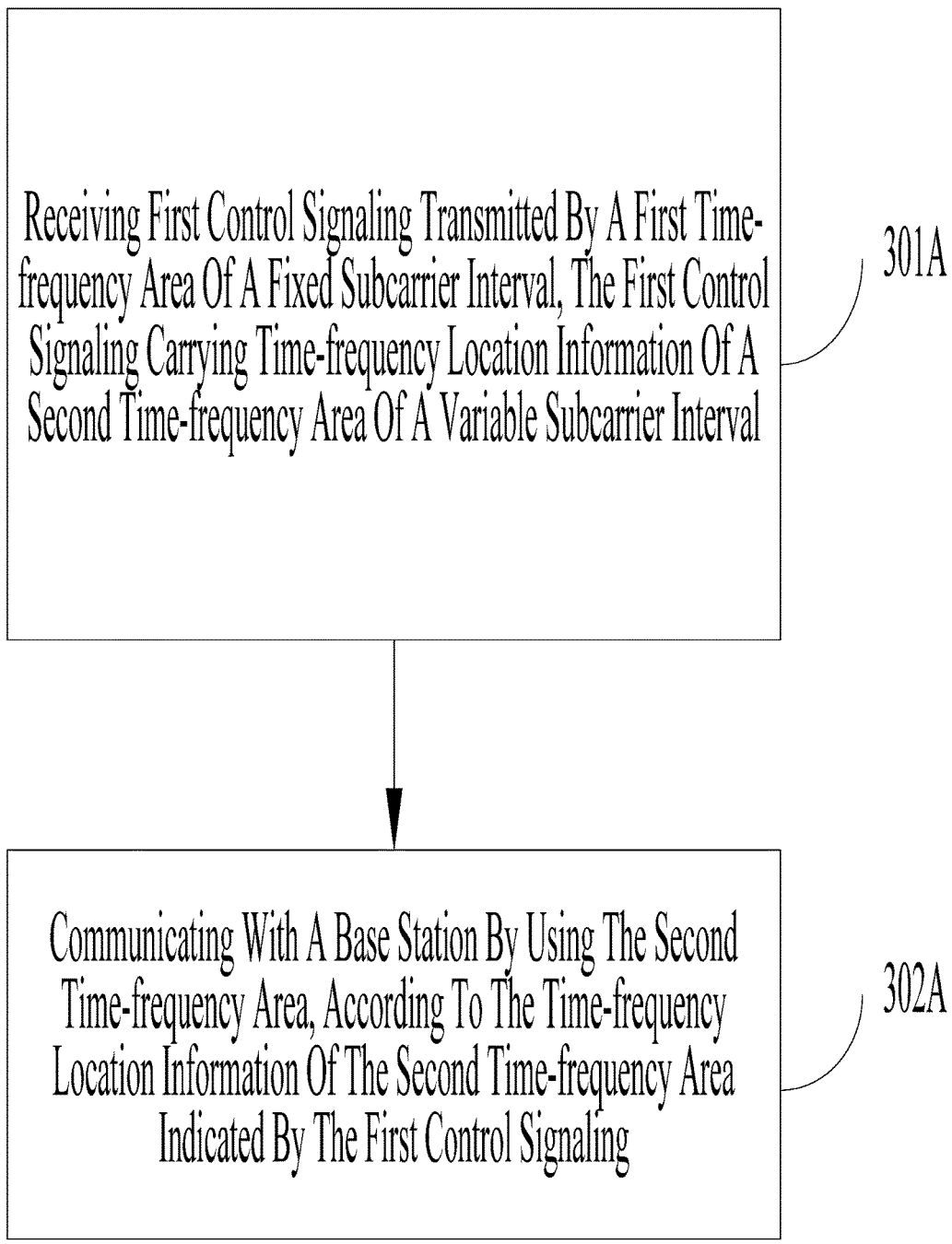
FIG. 3A is a flowchart illustrating a communication method according to an exemplary embodiment.

FIG. 3A is a flowchart illustrating a communication method according to an exemplary embodiment. As shown in FIG. 3A, the method is applied to a user equipment and includes the following steps.

In step 301a, first control signaling transmitted by a first time-frequency area is received. The first time-frequency area is a time-frequency area of a fixed subcarrier interval. The first control signaling carries time-frequency location information of a second time-frequency area, which is a time-frequency area with a variable subcarrier interval.

In step 302a, communications are performed with a base station by using the second time-frequency area, according to the time-frequency location information of the second time-frequency area indicated by the first control signaling.

According to the method provided in the embodiment of the present disclosure, with a first time-frequency area of a fixed subcarrier interval, a user equipment can be switched to a second time-frequency area of a variable subcarrier interval and communicate with a base station by using the second time-frequency area, thereby enabling switching of the user equipment to a variable subcarrier interval service with the fixed subcarrier interval service and addressing a situation where the user equipment cannot communicate with the base station normally when a subcarrier interval is configured flexibly.

In another embodiment, the first control signaling includes time-frequency location information of a time-frequency area for bearing second control signaling.

In another embodiment, the first control signaling further includes at least one of the following: time-frequency location information of a time-frequency area for receiving a reference signal, time-frequency location information of a time-frequency area for transmitting data, time-frequency location information of a time-frequency area for retransmitting data, power control information and schedule information.

In another embodiment, the fixed subcarrier interval is a subcarrier interval in an LTE mode.

In another embodiment, communicating with the base station by using the second time-frequency area includes communicating with the base station by using the second time-frequency area after a preset time length which includes an integer multiple of transmission time interval (TTI).

In another embodiment, the method further includes: switching from the second time-frequency area back to the first time-frequency area based on the schedule information in the first control signaling, the schedule information indicating time-frequency location information of the first time-frequency area; and communicating with the base station by using the first time-frequency area.

In another embodiment, the method further includes: switching from a current sub-band area of the second time-frequency area to another sub-band area of the second time-frequency area based on the schedule information in the first control signaling, the schedule information indicating time-frequency location information of the other sub-band area; and communicating with the base station by using the other sub-band area.

In another embodiment, the method further includes: receiving the second control signaling by using the second time-frequency area; switching from the second time-frequency area back to the first time-frequency area based on schedule information in the second control signaling, the schedule information indicating time-frequency location information of the first time-frequency area; and communicating with the base station by using the first time-frequency area.

In another embodiment, the method further includes: receiving the second control signaling by using the second time-frequency area; switching from a current sub-band area of the second time-frequency area to another sub-band area of the second time-frequency area based on schedule information in the second control signaling, the schedule information indicating time-frequency location information of the other sub-band area; and communicating with the base station by using the other sub-band area.

In another embodiment, the second control signaling includes at least one of the following: time-frequency location information of a time-frequency area for receiving a reference signal, time-frequency location information of a time-frequency area for transmitting data, time-frequency location information of a time-frequency area for retransmitting data, power control information and schedule information.

All the above optional technical solutions can form optional embodiments of the present disclosure in various combinations, which will not be described here one by one.

Figure 3B:
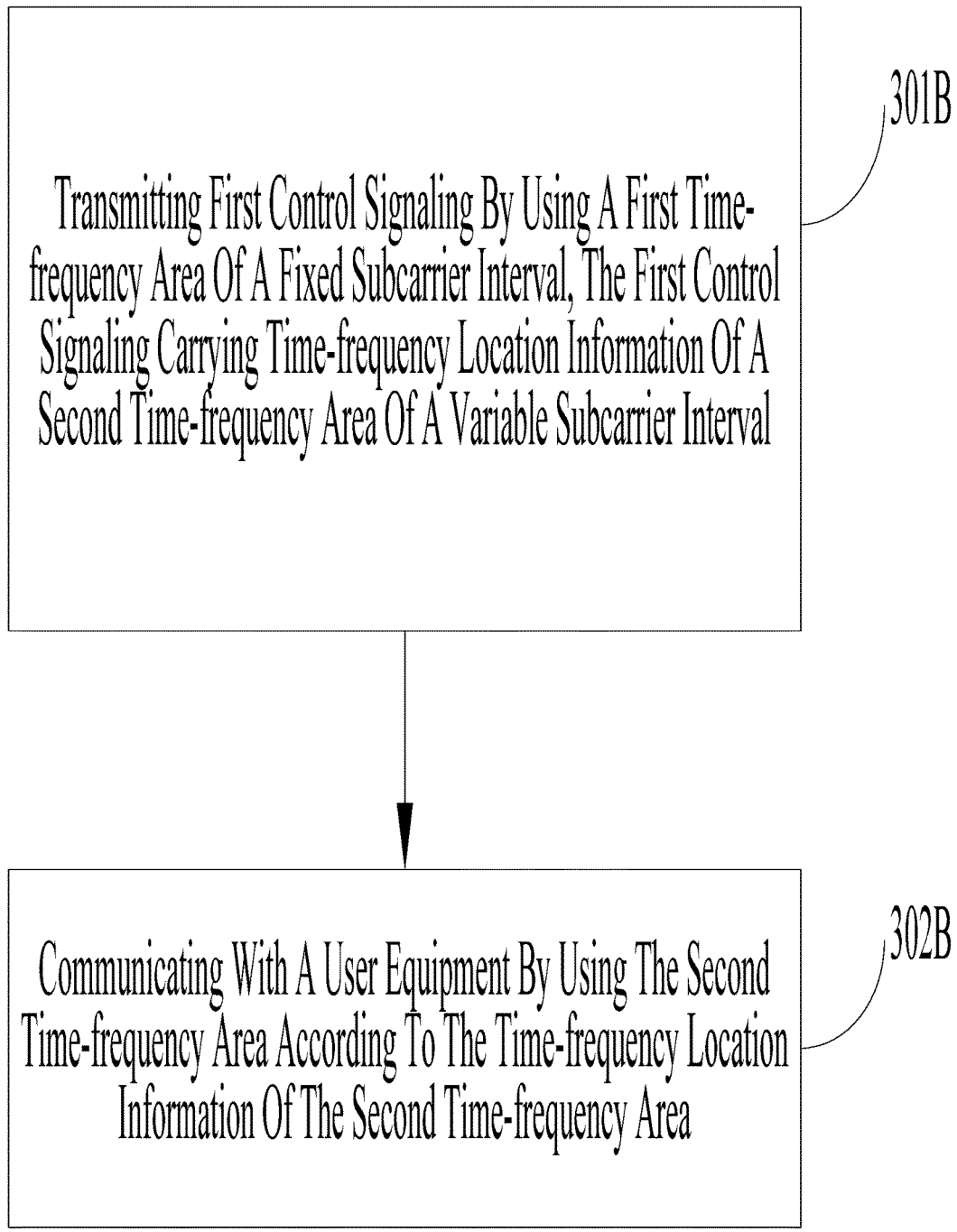
FIG. 3B is a flowchart illustrating a communication method according to an exemplary embodiment.

FIG. 3B is a flowchart illustrating a communication method according to an exemplary embodiment. As shown in FIG. 3B, the method is applied to a base station and includes the following steps.

In step 301b, first control signaling is transmitted by a first time-frequency area, which is at least one time-frequency area of a fixed subcarrier interval, the first control signaling carrying time-frequency location information of a second time-frequency area, which is a time-frequency area of a variable sub carrier interval.

In step 302b, communication is performed with a user equipment by using the second time-frequency area according to the time-frequency location information of the second time-frequency area.

According to the method provided in the embodiment of the present disclosure, with a first time-frequency area of a fixed subcarrier interval, a user equipment can communicate with a base station by using a second time-frequency area of a variable subcarrier interval, thereby enabling switching of the user equipment to a variable subcarrier interval service with a fixed subcarrier interval service and addressing a situation where the user equipment cannot communicate with the base station normally when a subcarrier interval is configured flexibly.

In another embodiment, the first control signaling includes time-frequency location information of a time-frequency area for bearing second control signaling.

In another embodiment, the first control signaling further includes at least one of the following: time-frequency location information of a time-frequency area for receiving a reference signal, time-frequency location information of a time-frequency area for transmitting data, time-frequency location information of a time-frequency area for retransmitting data, power control information and schedule information.

In another embodiment, the second control signaling includes at least one of the following: time-frequency location information of a time-frequency area for receiving a reference signal, time-frequency location information of a time-frequency area for transmitting data, time-frequency location information of a time-frequency area for retransmitting data, power control information and schedule information.

In another embodiment, the fixed subcarrier interval is a subcarrier interval in an LTE mode.

All the above optional technical solutions can form optional embodiments of the present disclosure in various combinations, which will not be described here one by one.

Figure 4:
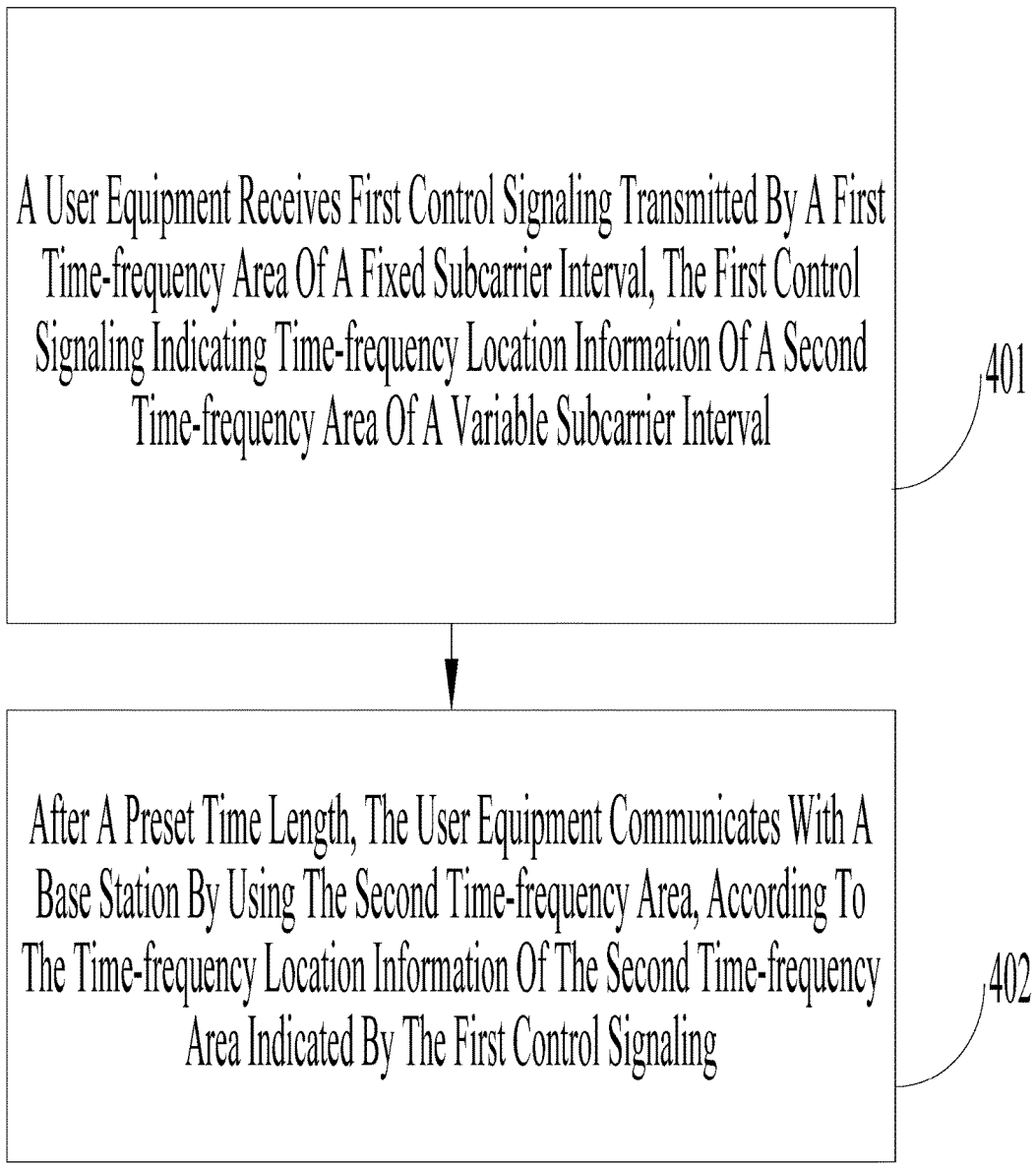
FIG. 4 is a flowchart illustrating a communication method according to an exemplary embodiment.

FIG. 4 is a flowchart illustrating a communication method according to an exemplary embodiment. As shown in FIG. 4, the interactions are performed between a user equipment and a base station and include the following steps.

In step 401a, the user equipment receives first control signaling transmitted by a first time-frequency area, which is at least one time-frequency area of a fixed subcarrier interval, the first control signaling indicating time-frequency location information of a second time-frequency area, which is a time-frequency area of a variable subcarrier interval.

In the embodiment of the present disclosure, the first time-frequency area and the second time-frequency area can be time-frequency areas within one carrier band and can also be time-frequency areas within a plurality of carrier bands, which is not limited in the embodiment of the present disclosure.

Figure 5:
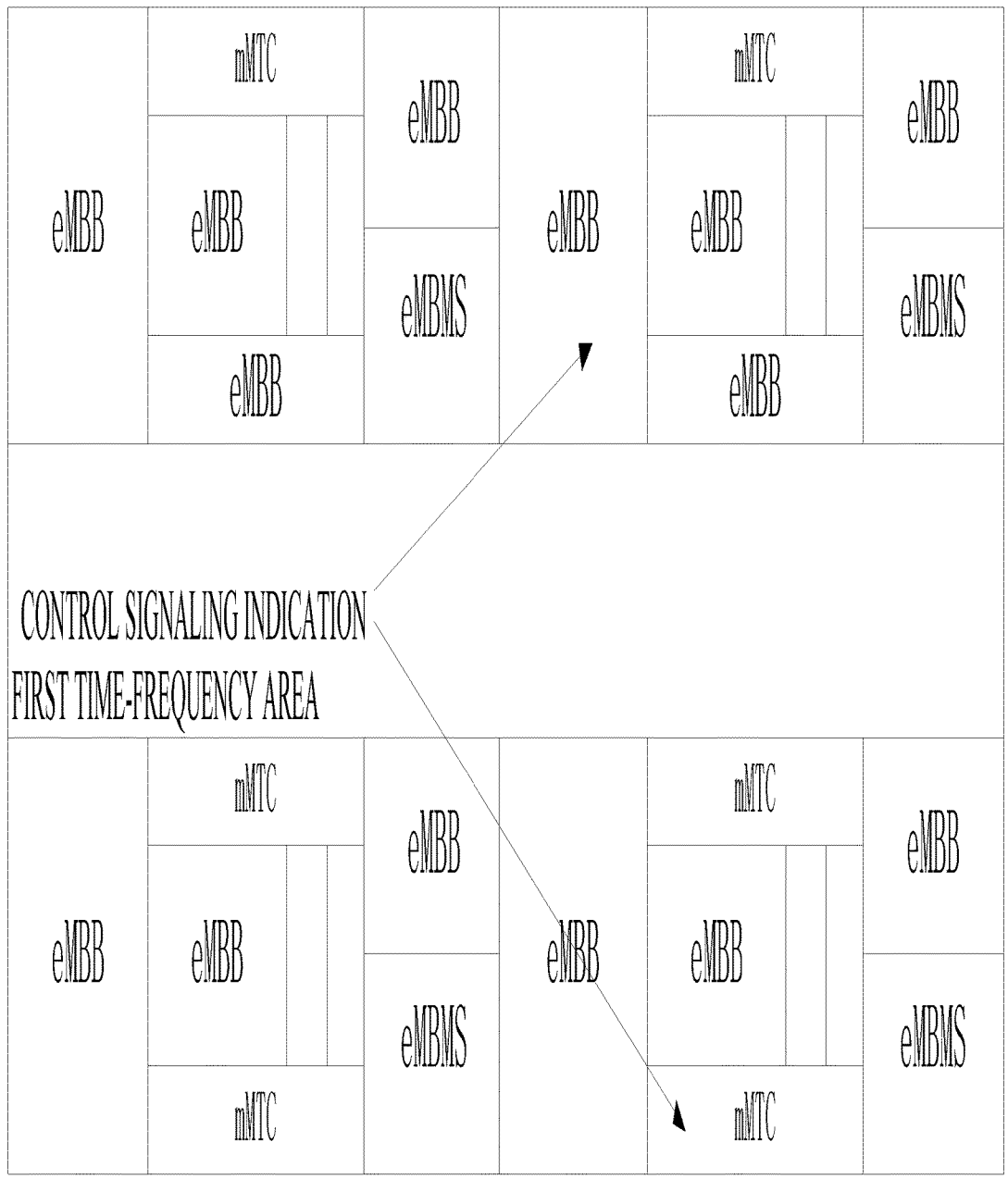
FIG. 5 is a schematic diagram illustrating a communication principle according to an exemplary embodiment.

If the first time-frequency area and the second time-frequency area are time-frequency areas within one carrier band, the first time-frequency area usually refers to a time-frequency area near the central frequency of this carrier band. For example, FIG. 5 illustrates three time-frequency areas into which one carrier band is divided. The central area in FIG. 5 is the first time-frequency area which is near the central frequency of this carrier band. The other two areas than the first time-frequency area correspond to the second time-frequency area.

If the first time-frequency area and the second time-frequency area are time-frequency areas within a plurality of carrier bands, the first time-frequency area and the second time-frequency area can each occupy at least one carrier band, which is not limited in the embodiments of the present disclosure. Hereinafter, description will be made by taking an example where the first time-frequency area and the second time-frequency area are time-frequency areas within one carrier band.

Figure 1:
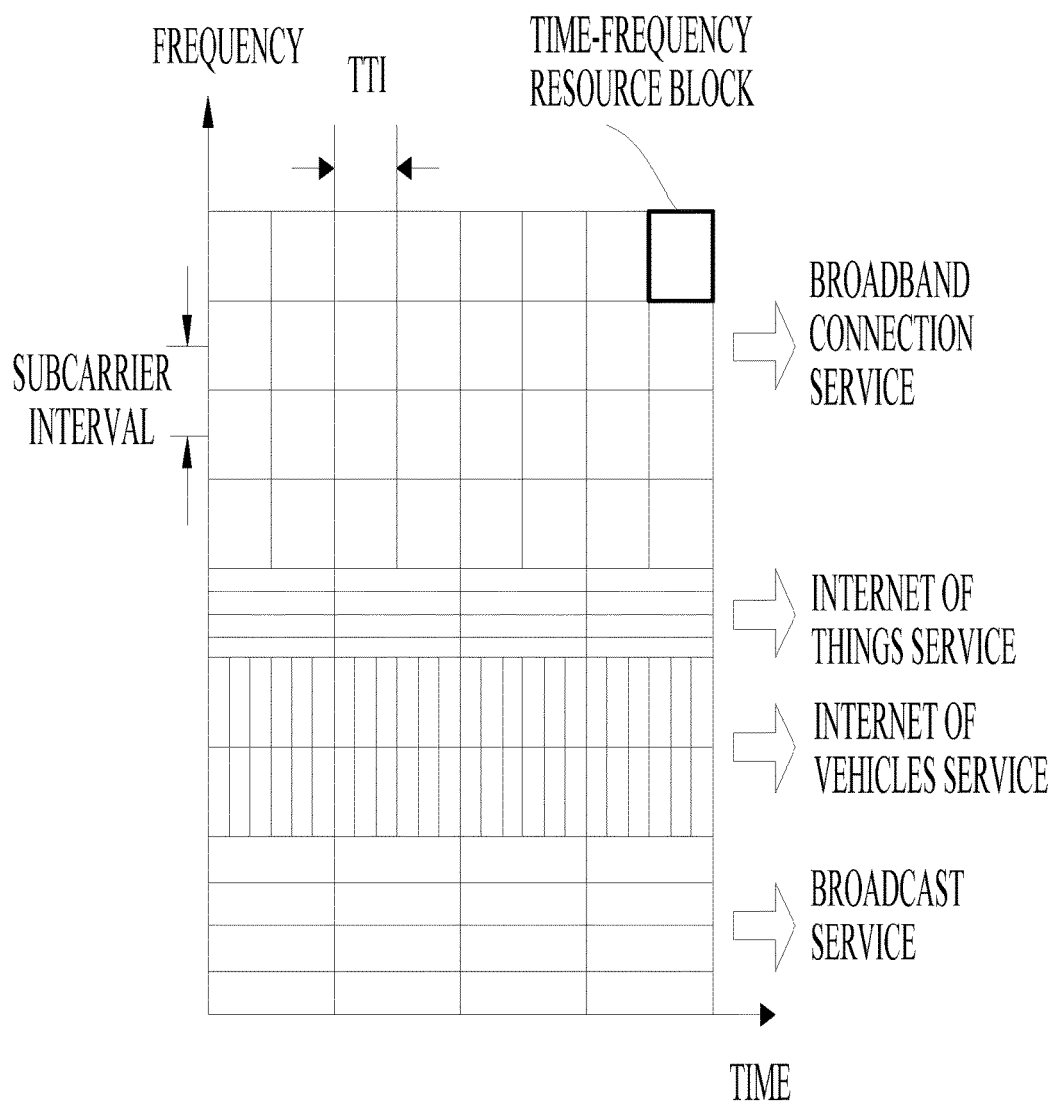
FIG. 1 is a schematic diagram illustrating a configuration of time-frequency resource blocks according to the background.

Since coming into the 5G stage, in order to achieve flexible service configuration, time-frequency resource blocks of different sizes are flexibly configured within one carrier band according to different service types, instead of configuring time-frequency resource blocks of the same size within one carrier band as before. As shown in FIG. 1, for a broadband connection service, the size of its corresponding time-frequency resource blocks is consistent, but the size of these time-frequency resource blocks is different from the size of the time-frequency resource blocks corresponding to an Internet of Things service, the size of the time-frequency resource blocks corresponding to an Internet of Vehicles and the size of the time-frequency resource blocks corresponding to a broadcast service respectively.

After the time-frequency resource blocks are configured flexibly, the subcarrier interval may also need to be configured flexibly according to service type. That is, within one carrier band, a variable subcarrier interval is set, instead of a conventional fixed subcarrier interval. In contrast, before the advent of 5G services, the subcarrier interval is always fixed. It should be noted that in the embodiments of the present disclosure, the fixed subcarrier interval refers to a subcarrier interval in the LTE mode, which is set as 15 kHz by the LTE system. In the case of fixed subcarrier interval, a user equipment can detect and access a base station normally, that is, can communicate with the base station normally. However, in the case of variable subcarrier interval, a user equipment cannot know the time-frequency resource locations for receiving control signaling and information data, and therefore cannot communicate with a base station normally. In view of this, in the embodiments of the present disclosure, a first time-frequency area is introduced to assist in accessing a second time-frequency area, so that a user equipment can communicate with a base station by using the second time-frequency area.

Both the first time-frequency area and the second time-frequency area can be time-frequency areas including a plurality of time-frequency resource blocks, except that they are different in size of constituent time-frequency resource blocks. As shown in FIG. 5, the first time-frequency area is a time-frequency area near the central frequency within a subcarrier band, and the subcarrier interval in the first time-frequency area is fixed, for example, having a fixed value of 15 kHz. All time-frequency resource blocks contained in the first time-frequency area are the same in size, that is, the span of each time-frequency resource block in the frequency domain and in the time domain is the same. In other words, the frequency range occupied by each time-frequency resource block in the frequency domain is the same, and the duration occupied by each time-frequency resource block in the time domain is the same.

In FIG. 5, all other areas than the first time-frequency area can be referred to as the second time-frequency area. In the second time-frequency area, time-frequency areas corresponding to respective types of 5G services are marked specifically. The 5G services include eMBB (enhanced Mobile Broad Band) service which corresponds to broadband connection service, mMTC (massive Machine Type Communication) service which corresponds to Internet of Things service, URLLC (Ultra Reliable Low Latency Communication) service which corresponds to Internet of Things service and broadcast service, and so on, which is not limited in the embodiments of the present disclosure. The second time-frequency area adopts a variable subcarrier interval. Depending on different service types, subcarrier intervals corresponding to respective services may be different. For example, as shown in FIG. 5, the subcarrier intervals of the eMBB service and the mMTC service in the frequency domain are different, and the subcarrier interval corresponding to the eMBB service is greater than that corresponding to the mMTC service. A user equipment can communicate with a base station by using the second time-frequency area indicated by the first signaling. For example, in FIG. 5, the user equipment communicates with the base station by using the time-frequency areas corresponding to the eMBB service and the mMTC service according to the indication of the first control signaling.

When the user equipment initially accesses the base station or switches from a fixed subcarrier interval service to a variable subcarrier interval service, the user equipment is triggered to receive the first control signaling by using the first time-frequency area. The fixed subcarrier interval service refers to a service such as 2G, 3G or 4G service or one of 5G services which adopts a fixed subcarrier interval. The variable subcarrier interval service refers to one of 5G services which adopts a variable subcarrier interval. In another embodiment, when the user equipment initially accesses the base station or switches from a variable subcarrier interval service to a fixed subcarrier interval service, the user equipment, before switching to a variable subcarrier interval service again, always communicates with the base station by using the first time-frequency area so as to perform normal measurement and data transmission and so on.

The first control signaling is transmitted by using the first time-frequency area between the base station and the user equipment. In the embodiments of the present disclosure, the first control signaling at least includes time-frequency location information of a time-frequency area for bearing second control signaling. The transmission location of the second control signaling is different from that of the first control signaling, and the content carried by the second control signaling is also different from that carried by the first control signaling. The first control signaling is transmitted by using the first time-frequency area, that is, transmitted by using a time-frequency area with a fixed subcarrier interval; while the second control signaling is transmitted by using the second time-frequency area, that is, transmitted by using a 5G time-frequency area with a variable subcarrier interval.

In addition, the first control signaling may further include at least one of the following: time-frequency location information of a time-frequency area for receiving a reference signal, time-frequency location information of a time-frequency area for transmitting data, time-frequency location information of a time-frequency area for retransmitting data, power control information and schedule information. The reference signal (RS) refers to a pilot signal which is a known signal provided by the base station to the user equipment for channel estimation or channel detection. According to the time-frequency location information of the time-frequency area for receiving the reference signal, the user equipment can know at which location of the second time-frequency area to receive the reference signal transmitted by the base station. According to the time-frequency location information of the time-frequency area for transmitting data, the user equipment can know at which location of the second time-frequency area to perform data transmission with the base station. According to the time-frequency location information of the time-frequency area for retransmitting data, the user equipment can know at which location of the second time-frequency area to perform data retransmission with the base station. The power control information is used for indicating whether power needs to be changed when the user equipment switches from the first time-frequency area to the second time-frequency area. The schedule information is used for indicating to the user equipment which service to switch to after completing a certain service by using the second time-frequency area.

It should be noted that the first control signaling may include time-frequency location information of a time-frequency area for bearing second control signaling and the above other information simultaneously. The purpose of doing so is to enable the user equipment to receive the reference signal, perform data transmission and/or the like by using a specified time-frequency area in the second time-frequency area directly according to the time-frequency location information indicated by the first control signaling, thereby eliminating the need for the user equipment to first receive the second control signaling by using the second time-frequency area according to the indication of the first control signaling and then receive the reference signal, perform data transmission and/or the like by using a specified time-frequency area in the second time-frequency area according to the indication of the second control signaling.

In an embodiment of the present disclosure, the second control signaling may include other information than time-frequency location information of a time-frequency area for bearing the second control signaling. That is, the second control signaling includes at least one of the following: time-frequency location information of a time-frequency area for receiving a reference signal, time-frequency location information of a time-frequency area for transmitting data, time-frequency location information of a time-frequency area for retransmitting data, power control information and schedule information.

That is, after receiving the first control signaling, the user equipment can read the second control signaling at a specific location of the second time-frequency area, according to time-frequency location information of a time-frequency area for bearing the second control signaling carried in the first control signaling. The second control signaling further indicates time-frequency location information for receiving the reference signal, time-frequency location information for retransmitting data and so on. Then, according to these time-frequency location information, the user equipment can know at which locations of the second time-frequency area to receive the reference signal, perform data transmission and so on.

One implementation of the first control signaling and the second control signaling is PDCCH (Physical Downlink Control Channel) and its evolution, PBCH (Physical broadcast channel) and its evolution, PHICH (Physical Hybrid ARQ Indicator Channel) and its evolution, PCFICH (Physical Control Format Indicator Channel) and its evolution, PUCCH (Physical Uplink Control Channel) and its evolution, PRACH (Physical Random Access Channel) and its evolution or the like, which is not limited in the embodiments of the present disclosure.

In step 402, after a preset time length, the user equipment communicates with the base station by using the second time-frequency area, according to the time-frequency location information of the second time-frequency area indicated by the first control signaling.

The preset time length includes an integer multiple of TTI. That is, after reading the first control signaling by using the first time-frequency area during the integer multiple of TTI, the user equipment communicates with the base station by using the second time-frequency area. The specific number of TTIs included by the preset time length is not limited in the embodiments of the present disclosure. In an embodiment of the present disclosure, the integer multiple of TTI can be an overall time length of several time-frequency resource blocks in the first time-frequency area, an overall time length of some time-frequency resource blocks in the first time-frequency area added by an overall time length of some time-frequency resource blocks in the second time-frequency area, or an overall time length of several time-frequency resource blocks in the second time-frequency area, which is not limited in the embodiments of the present disclosure. The time length of one time-frequency resource block can be referred to as one TTI.

It should be noted that after the user equipment switches from the first time-frequency area to the second time-frequency area and completes service processing in the second time frequency area (for example, after completing eMBB service processing in the second time-frequency area as shown by the upward arrow in FIG. 5), the user equipment can switch to a time-frequency area where a new service is located (such as switching to an mMTC service) so as to continue to process the new service as indicated by the system. In addition, it can also switch back to the first time-frequency area, which is not limited in the embodiments of the present disclosure. The switching can be performed as specifically indicated by the schedule information.

Take switching back to the first time-frequency area as an example. Because the user equipment can receive the first control signaling by using the first time-frequency area in addition to receiving the second control signaling by using the second time-frequency area, the user equipment can switch from the second time-frequency area back to the first time-frequency area based on either the first control signaling or the second control signaling. The specific switching manners are as follows.

In a first manner, the user equipment switches from the second time-frequency area back to the first time-frequency area based on the schedule information in the first control signaling, the schedule information indicating time-frequency location information of the first time-frequency area. By using the first time-frequency area, the user equipment communicates with the base station.

In a second manner, the user equipment receives the second control signaling by using the second time-frequency area, and switches from the second time-frequency area back to the first time-frequency area based on the schedule information in the second control signaling, the schedule information indicating time-frequency location information of the first time-frequency area. By using the first time-frequency area, the user equipment communicates with the base station.

Take switching to another sub-band area of the second time-frequency area as an example. Because the user equipment can receive the first control signaling by using the first time-frequency area in addition to receiving the second control signaling by using the second time-frequency area, the user equipment can switch from a current sub-band area of the second time-frequency area to the other sub-band area of the second time-frequency area based on either the first control signaling or the second control signaling. The specific switching manners as follows.

In a first manner, the user equipment switches from a current sub-band area of the second time-frequency area to another sub-band area of the second time-frequency area based on the schedule information in the first control signaling, the schedule information indicating time-frequency location information of the other sub-band area. By using the other sub-band area, the user equipment communicates with the base station.

In a second manner, the user equipment receives the second control signaling by using the second time-frequency area, and switches from a current sub-band area of the second time-frequency area to another sub-band area of the second time-frequency area based on the schedule information in the first control signaling, the schedule information indicating time-frequency location information of the other sub-band area. By using the other sub-band area, the user equipment communicates with the base station.

In another embodiment, after the user equipment switches to a 5G service, there may occur a situation where the user equipment moves into a region in which the 5G service is not supported since the coverage of 5G services is limited currently. In this situation, the user equipment needs to switch from the 5G service to a service such as 2G, 3G or 4G service. When the signal strength of the 5G service is lower than a preset threshold, the user equipment may switch from the 5G service to a non-5G service, and then the user equipment may communicate with the base station by using the first time-frequency area. The preset threshold can be 90 dbm, 100 dbm or the like, which is not limited in the embodiments of the present disclosure. When the signal strength of the 5G service is lower than the preset threshold, it indicates that the user equipment has now moved far away from the region covered by the 5G service or has already arrived at a region which has no 5G service coverage at all. At this point, service switching has to be performed according to the above manners.

In the communication method illustrated by steps 401 and 402, in order to ensure normal communications between the user equipment and the base station after using a variable subcarrier interval in the frequency domain, the user equipment switches to the second time-frequency area of a variable subcarrier interval with the first time-frequency area of a fixed subcarrier interval, so that the user equipment can communicate with the base station normally by using the second time-frequency area. It should be noted that, in order to achieve flexible configuration of services, a variable duration interval can be used in the time domain in addition to or instead of using a variable subcarrier interval in the frequency domain. That is, the durations of the time-frequency resource blocks of different services in the time domain can be adjusted according to different service types. For example, an Internet of Vehicles service needs a lower latency and a more reliable connection, that is, data should be transmitted within a relatively short time reliably so that the transmission time is short. Therefore, the duration occupied by a time-frequency resource block corresponding to the Internet of Vehicles service is set short. The principle for setting durations in the time domain is the same as the principle for setting intervals in the frequency domain, that is, durations corresponding to different services are different. In a scenario where the duration in the time domain is variable, the user equipment and the base station communicate with each other according to the same method as that illustrated by steps 401 and 402, which will not be described here redundantly.

In the communication method illustrated by steps 401 and 402, the first time-frequency area with a fixed subcarrier interval is a consecutive time-frequency area as a whole. In another embodiment, the first time-frequency area can be a time-frequency area composed of a plurality of small time-frequency areas, instead of being a consecutive time-frequency area as a whole. Each small time-frequency area can be composed of a plurality of time-frequency resource blocks, and each time-frequency resource block adopts a subcarrier interval in the LTE mode. For different services, small time-frequency area windows for transmitting the first control signaling may be different. Therefore, the base station needs to issue to the user equipment time-frequency location information of time-frequency area windows for transmitting the first control signaling for different services in advance, so that the user equipment receives the first control signaling by using the accurate time-frequency area window. In addition, in this scenario, the user equipment and the base station communicate with each other according to the same method as that illustrated by steps 401 and 402, which will not be described here redundantly.

According to the method provided in the embodiments of the present disclosure, with a first time-frequency area of a fixed subcarrier interval, a user equipment can communicate with a base station by using a second time-frequency area of a variable subcarrier interval, thereby enabling switching of the user equipment to a variable subcarrier interval service with the assistance of a fixed subcarrier interval service and addressing a situation where the user equipment cannot communicate with the base station normally when a subcarrier interval is configured flexibly.

Figure 6A:
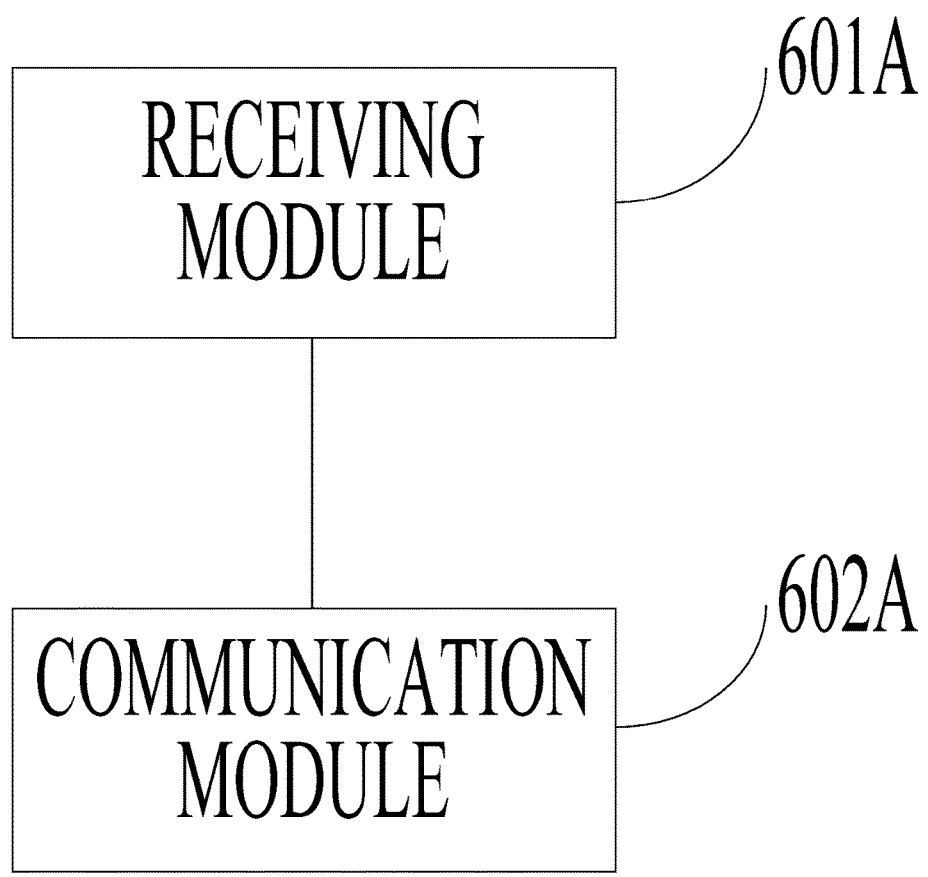
FIG. 6A is a block diagram illustrating a communication apparatus according to an exemplary embodiment.

FIG. 6A is a block diagram illustrating a communication apparatus according to an exemplary embodiment. Referring to FIG. 6A, the apparatus includes a receiving module 601a and a communication module 602a.

The receiving module 601a is configured to receive first control signaling transmitted by a first time-frequency area, which is at least one time-frequency area of a fixed subcarrier interval, the first control signaling carrying time-frequency location information of a second time-frequency area, which is a time-frequency area of a variable subcarrier interval.

The communication module 602a is configured to communicate with a base station by using the second time-frequency area, according to the time-frequency location information of the second time-frequency area indicated by the first control signaling.

In another embodiment, the first control signaling includes time-frequency location information of a time-frequency area for bearing second control signaling.

In another embodiment, the first control signaling further includes at least one of the following: time-frequency location information of a time-frequency area for receiving a reference signal, time-frequency location information of a time-frequency area for transmitting data, time-frequency location information of a time-frequency area for retransmitting data, power control information and schedule information.

In another embodiment, the fixed subcarrier interval is a subcarrier interval in an LTE mode.

In another embodiment, the communication module 602a is configured to communicate with the base station by using the second time-frequency area after a preset time length which includes an integer multiple of TTI.

In another embodiment, the communication module 602a is further configured to: switch from the second time-frequency area back to the first time-frequency area based on the schedule information in the first control signaling, the schedule information indicating time-frequency location information of the first time-frequency area; and communicate with the base station by using the first time-frequency area.

In another embodiment, the communication module 602a is further configured to: switch from a current sub-band area of the second time-frequency area to another sub-band area of the second time-frequency area based on the schedule information in the first control signaling, the schedule information indicating time-frequency location information of the other sub-band area; and communicate with the base station by using the other sub-band area.

In another embodiment, the communication module 602a is further configured to: receive the second control signaling by using the second time-frequency area; switch from the second time-frequency area back to the first time-frequency area based on schedule information in the first control signaling, the schedule information indicating time-frequency location information of the first time-frequency area; and communicate with the base station by using the first time-frequency area.

In another embodiment, the communication module 602a is further configured to: receive the second control signaling by using the second time-frequency area; switch from a current sub-band area of the second time-frequency area to another sub-band area of the second time-frequency area based on the schedule information in the first control signaling, the schedule information indicating time-frequency location information of the other sub-band area; and communicate with the base station by using the other sub-band area.

In another embodiment, the second control signaling includes at least one of the following: time-frequency location information of a time-frequency area for receiving a reference signal, time-frequency location information of a time-frequency area for transmitting data, time-frequency location information of a time-frequency area for retransmitting data, power control information and schedule information.

According to the apparatus provided in the embodiments of the present disclosure, with the assistance of a first time-frequency area with a fixed subcarrier interval, a user equipment can communicate with a base station by using a second time-frequency area with a variable subcarrier interval, thereby enabling switching of the user equipment to a variable subcarrier interval service with the assistance of a fixed subcarrier interval service and addressing a situation where the user equipment cannot communicate with the base station normally when a subcarrier interval is configured flexibly.

Figure 6B:
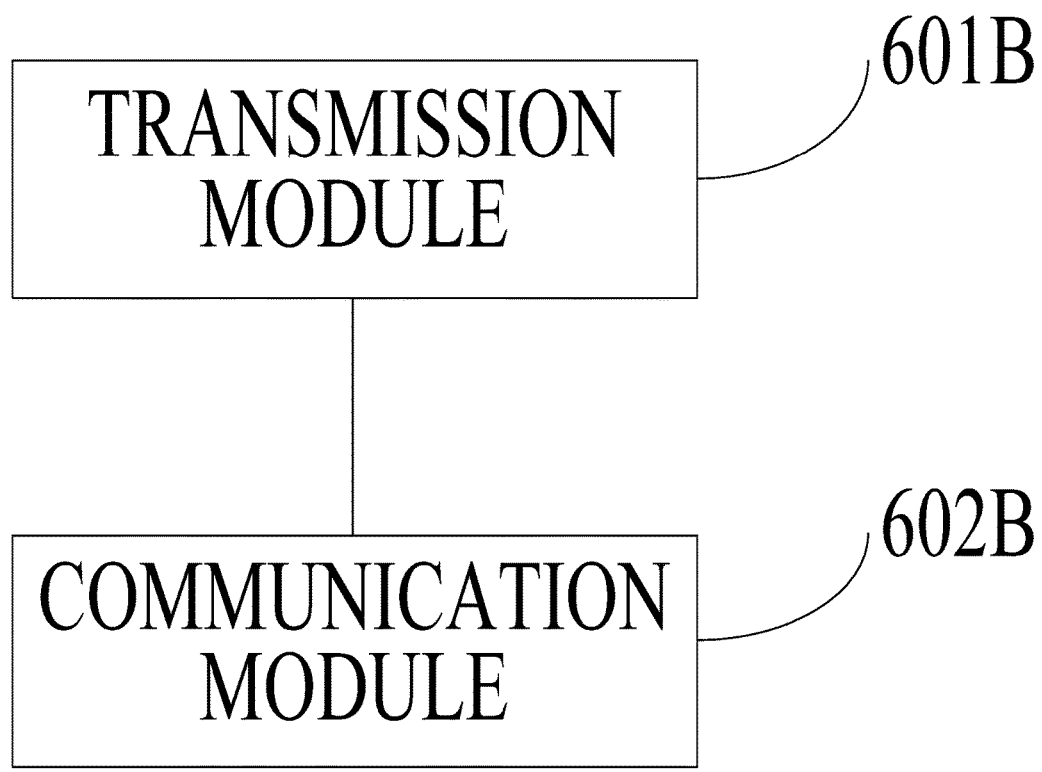
FIG. 6B is a block diagram illustrating a communication apparatus according to an exemplary embodiment.

FIG. 6B is a block diagram illustrating a communication apparatus according to an exemplary embodiment. Referring to FIG. 6B, the apparatus includes a transmission module 601b and a communication module 602b.

The transmission module 601b is configured to transmit first control signaling by using a first time-frequency area, which is at least one time-frequency area of a fixed subcarrier interval, the first control signaling carrying time-frequency location information of a second time-frequency area, which is a time-frequency area of a variable subcarrier interval.

The communication module 602b is configured to communicate with a user equipment by using the second time-frequency area according to the time-frequency location information of the second time-frequency area.

In another embodiment, the first control signaling includes time-frequency location information of a time-frequency area for bearing second control signaling.

In another embodiment, the first control signaling further includes at least one of the following: time-frequency location information of a time-frequency area for receiving a reference signal, time-frequency location information of a time-frequency area for transmitting data, time-frequency location information of a time-frequency area for retransmitting data, power control information and schedule information.

In another embodiment, the second control signaling includes at least one of the following: time-frequency location information of a time-frequency area for receiving a reference signal, time-frequency location information of a time-frequency area for transmitting data, time-frequency location information of a time-frequency area for retransmitting data, power control information and schedule information.

In another embodiment, the fixed subcarrier interval refers to a subcarrier interval in an LTE mode.

According to the apparatus provided in the embodiments of the present disclosure, with a first time-frequency area with a fixed subcarrier interval, a user equipment can communicate with a base station by using a second time-frequency area of a variable subcarrier interval, thereby enabling switching of the user equipment to a variable subcarrier interval service with the assistance of a fixed subcarrier interval service and addressing a situation where that the user equipment cannot communicate with the base station normally when a subcarrier interval is configured flexibly.

As to the apparatus in the above embodiment, the specific manners for various modules to perform operations have been described in detail in embodiments related to the methods, and will not be elaborated here.

Figure 7:
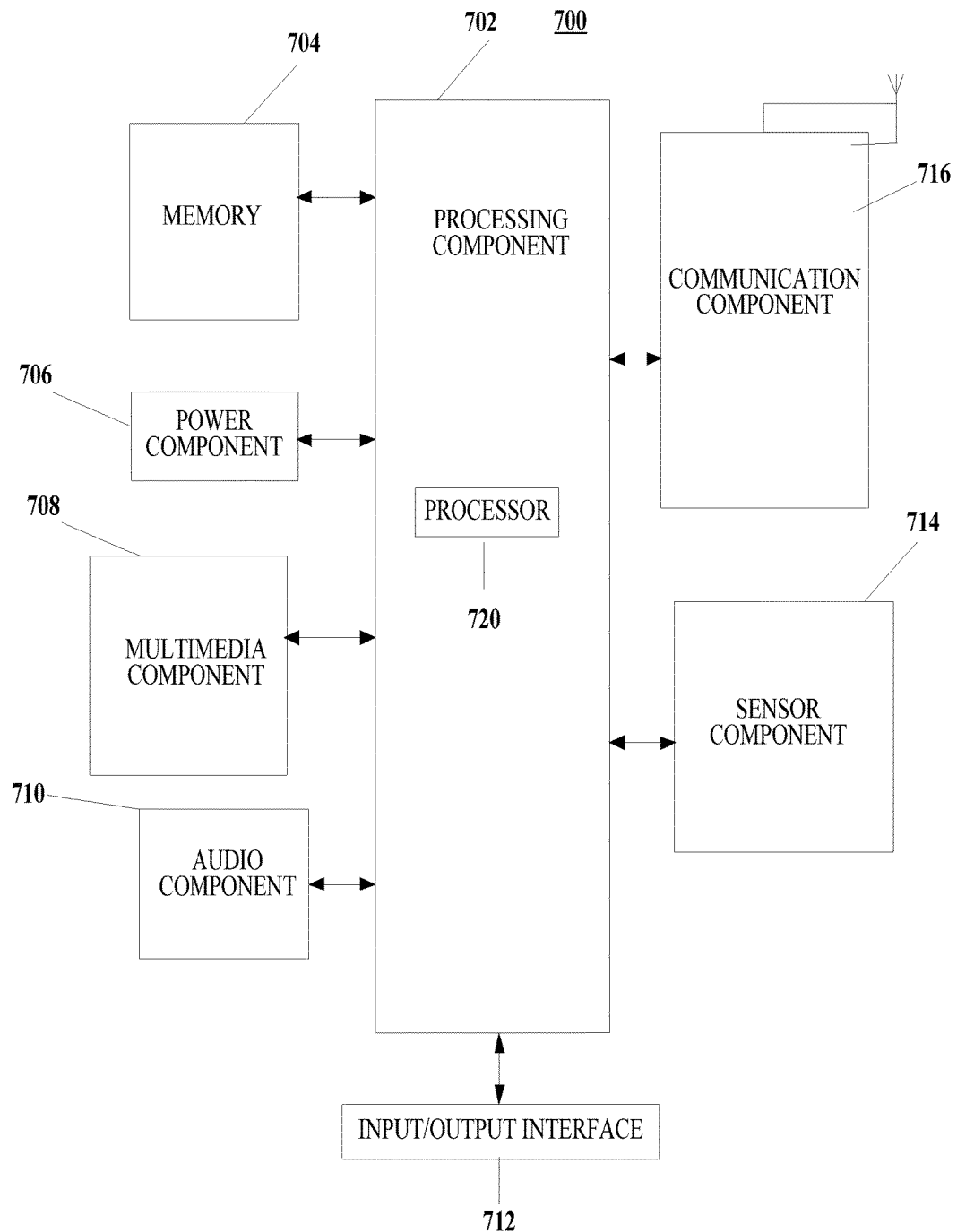
FIG. 7 is a block diagram illustrating a communication apparatus according to an exemplary embodiment.

FIG. 7 is a block diagram illustrating a communication apparatus 700 according to an exemplary embodiment. For example, the apparatus 700 may be a mobile phone, a computer, a digital broadcast terminal, a messaging device, a gaming console, a tablet, a medical device, exercise equipment, a personal digital assistant or the like.

Referring to FIG. 7, the apparatus 700 may include one or more of the following components: a processing component 702, a memory 704, a power component 706, a multimedia component 708, an audio component 710, an input/output (I/O) interface 712, a sensor component 714 and a communication component 716.

The processing component 7022 generally controls the overall operations of the apparatus 700, such as operations associated with display, phone call, data communications, camera operations and record operations. The processing component 702 may include one or more processors 720 to execute instructions to perform all or part of the steps in the above described methods. In addition, the processing component 702 may include one or more modules to facilitate the interaction between the processing component 702 and other components. For example, the processing component 702 may include a multimedia module to facilitate the interaction between the multimedia component 708 and the processing component 702.

The memory 704 is configured to store various types of data to support the operations of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power supply management system, one or more power sources, and any other components associated with the generation, management, and distribution of power in the apparatus 700.

The multimedia component 708 includes a screen providing an output interface between the apparatus 700 and the user. In some embodiments, the screen may include LCD (Liquid Crystal Display) and TP (Touch Panel). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive external multimedia data while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may include an optical sensor, such as CMOS (Complementary Metal Oxide Semiconductor) or CCD (Charge-coupled Device) image sensor for imaging applications. In some embodiments, the sensor component 714 may also include an accelerometer sensor, a gyroscope sensor, a magnetic sensor, a pressure sensor or a temperature sensor.

The communication component 716 is configured to facilitate wired or wireless communication between the apparatus 700 and other devices. The apparatus 700 can access a wireless network based on a communication standard, such as WiFi, 2G, or 3G, or a combination thereof. In one exemplary embodiment, the communication component 716 receives a broadcast signal or broadcast related information from an external broadcast management system via a broadcast channel. In one exemplary embodiment, the communication component 716 further includes a near field communication (NFC) module to facilitate short-range communications. For example, the NFC module may be implemented based on RFID (Radio Frequency Identification) technology, IrDA (Infra-red Data Association) technology, UWB (Ultra Wideband) technology, BT (Bluetooth) technology and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 704, executable by the processor 720 of the apparatus 700, for performing the above-described methods. For example, the non-transitory computer-readable storage medium may be a ROM, a RAM (Random Access Memory), a CD-ROM (Compact Disc Read-Only Memory), a magnetic tape, a floppy disc, an optical data storage device, and the like.

The non-transitory computer-readable storage medium stores executable instructions that, when executed by the processor of a user equipment, cause the user equipment to execute the aforementioned communication method.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A communication method, applied to a user equipment, the method comprising:
receiving first control signaling transmitted by a first time-frequency area of a fixed subcarrier interval, the first control signaling carrying time-frequency location information of a second time-frequency area of a variable subcarrier interval; and
communicating with a base station by using the second time-frequency area, according to the time-frequency location information of the second time-frequency area indicated by the first control signaling,
wherein the first control signaling comprises time-frequency location information of a time-frequency area for bearing second control signaling, and
communicating with the base station by using the second time-frequency area comprises: communicating with the base station by using the second time-frequency area after a preset time length which comprises an integer multiple of transmission time interval (TTI).

2. The method according to claim 1, wherein the first control signaling further comprises at least one of the following: time-frequency location information of a time-frequency area for receiving a reference signal, time-frequency location information of a time-frequency area for transmitting data, time-frequency location information of a time-frequency area for retransmitting data, power control information and schedule information.

3. The method according to claim 2, further comprising:
switching from the second time-frequency area back to the first time-frequency area based on the schedule information in the first control signaling, the schedule information indicating time-frequency location information of the first time-frequency area; and
communicating with the base station by using the first time-frequency area.

4. The method according to claim 2, further comprising:
switching from a current sub-band area of the second time-frequency area to another sub-band area of the second time-frequency area based on the schedule information in the first control signaling, the schedule information indicating time-frequency location information of the other sub-band area; and
communicating with the base station by using the other sub-band area.

5. The method according to claim 1, wherein the fixed subcarrier interval is a subcarrier interval in a long term evolution (LTE) mode.

6. The method according to claim 1, further comprising:
receiving the second control signaling by using the second time-frequency area;
switching from the second time-frequency area back to the first time-frequency area based on schedule information in the second control signaling, the schedule information indicating time-frequency location information of the first time-frequency area; and
communicating with the base station by using the first time-frequency area.

7. The method according to claim 1, further comprising:
receiving the second control signaling by using the second time-frequency area;
switching from a current sub-band area of the second time-frequency area to another sub-band area of the second time-frequency area based on schedule information in the second control signaling, the schedule information indicating time-frequency location information of the other sub-band area; and
communicating with the base station by using the other sub-band area.

8. The method according to claim 1, wherein the second control signaling comprises at least one of the following: time-frequency location information of a time-frequency area for receiving a reference signal, time-frequency location information of a time-frequency area for transmitting data, time-frequency location information of a time-frequency area for retransmitting data, power control information and schedule information.

9. A communication method, applied to a base station, the method comprising:
transmitting first control signaling by using a first time-frequency area of a fixed subcarrier interval, the first control signaling carrying time-frequency location information of a second time-frequency area of a variable subcarrier interval; and
communicating with a user equipment by using the second time-frequency area, according to the time-frequency location information of the second time-frequency area,
wherein the first control signaling comprises time-frequency location information of a time-frequency area for bearing second control signaling, and
communicating with the user equipment by using the second time-frequency area comprises: communicating with the user equipment by using the second time-frequency area after a preset time length which comprises an integer multiple of transmission time interval (TTI).

10. A communication apparatus, comprising:
a processor; and
a memory for storing instructions executable by the processor,
wherein the processor is configured to:
receive first control signaling transmitted by a first time-frequency area of a fixed subcarrier interval, the first control signaling carrying time-frequency location information of a second time-frequency area of a variable subcarrier interval; and
communicate with a base station by using the second time-frequency area, according to the time-frequency location information of the second time-frequency area indicated by the first control signaling,
wherein the first control signaling comprises time-frequency location information of a time-frequency area for bearing second control signaling, and
the processor configured to communicate with the base station by using the second time-frequency area is further configured to: communicate with the base station by using the second time-frequency area after a preset time length which comprises an integer multiple of TTI.

11. The communication apparatus of claim 10, wherein the first control signaling further comprises at least one of the following: time-frequency location information of a time-frequency area for receiving a reference signal, time-frequency location information of a time-frequency area for transmitting data, time-frequency location information of a time-frequency area for retransmitting data, power control information and schedule information.

12. The communication apparatus of claim 11, wherein the processor is further configured to:
switch from the second time-frequency area back to the first time-frequency area based on the schedule information in the first control signaling, the schedule information indicating time-frequency location information of the first time-frequency area; and
communicate with the base station by using the first time-frequency area.

13. The communication apparatus of claim 11, wherein the processor is further configured to:
switch from a current sub-band area of the second time-frequency area to another sub-band area of the second time-frequency area based on the schedule information in the first control signaling, the schedule information indicating time-frequency location information of the other sub-band area; and
communicate with the base station by using the other sub-band area.

14. The communication apparatus of claim 10, wherein the fixed subcarrier interval is a subcarrier interval in a LTE mode.

15. The communication apparatus of claim 10, wherein the processor is further configured to:
receive the second control signaling by using the second time-frequency area;
switch from the second time-frequency area back to the first time-frequency area based on schedule information in the second control signaling, the schedule information indicating time-frequency location information of the first time-frequency area; and
communicate with the base station by using the first time-frequency area.

16. The communication apparatus of claim 10, wherein the processor is further configured to:
receive the second control signaling by using the second time-frequency area;
switch from a current sub-band area of the second time-frequency area to another sub-band area of the second time-frequency area based on schedule information in the second control signaling, the schedule information indicating time-frequency location information of the other sub-band area; and
communicate with the base station by using the other sub-band area.

17. A non-transitory computer-readable storage medium having stored therein instructions that, when executed by a processor of a mobile terminal, causes the mobile terminal to perform a communication method, the method comprising:
receiving first control signaling transmitted by a first time-frequency area of a fixed subcarrier interval, the first control signaling carrying time-frequency location information of a second time-frequency area of a variable subcarrier interval; and
communicating with a base station by using the second time-frequency area, according to the time-frequency location information of the second time-frequency area indicated by the first control signaling,
wherein the first control signaling comprises time-frequency location information of a time-frequency area for bearing second control signaling, and
communicating with the base station by using the second time-frequency area comprises: communicating with the base station by using the second time-frequency area after a preset time length which comprises an integer multiple of transmission time interval (TTI).

* * * * *